United States Patent [19]

Asbury et al.

[11] 4,035,760
[45] July 12, 1977

[54] OBJECT DETECTING SYSTEM

[75] Inventors: George F. Asbury, San Diego, Calif.; Earl J. Kohn, Washington, D.C.; James R. Richards, Cheverly, Md.

[73] Assignee: The United States of America as represented by the Secretary of the Navy, Washington, D.C.

[21] Appl. No.: 247,186

[22] Filed: Sept. 18, 1951

[51] Int. Cl.² .................. G01S 9/66; G01S 9/44
[52] U.S. Cl. .................. 340/3 D; 343/7.7; 343/8
[58] Field of Search .......... 343/8, 9, 13, 100, 7.7; 177/386.1 ET; 340/3 D

[56] References Cited

U.S. PATENT DOCUMENTS

| | | | |
|---|---|---|---|
| 2,405,134 | 8/1946 | Brown et al. | 177/386.1 |
| 2,408,415 | 10/1946 | Donaldson | 343/13 |
| 2,485,583 | 10/1949 | Ginzton | 343/13 |
| 2,520,693 | 8/1950 | Roberts | 343/113 |
| 2,556,211 | 6/1951 | Page | 343/13 |
| 2,582,971 | 1/1952 | Dunmore | 343/6 |
| 2,679,042 | 5/1954 | McMullen | 343/7.7 |

Primary Examiner—Maynard R. Wilbur
Assistant Examiner—Richard Berger
Attorney, Agent, or Firm—R. S. Sciascia; Philip Schneider

EXEMPLARY CLAIM

1. A system for detecting the movement of a remote object comprising transmitting means for illuminating said remote object with a signal of wave energy, receiving means for recovering an echo reflected by said object, signal display means responsive to said echo to provide a separate visual display of each cycle of said reflected echo, and frequency comparing means responsive to a difference in frequency between the wave energy of said received echo and the wave energy of said transmitted signal to vary the orientation of said visual indication from a reference orientation, whereby a variation in said orientation will provide an instantaneous indication of a doppler effect on said transmitted wave energy.

16 Claims, 3 Drawing Figures

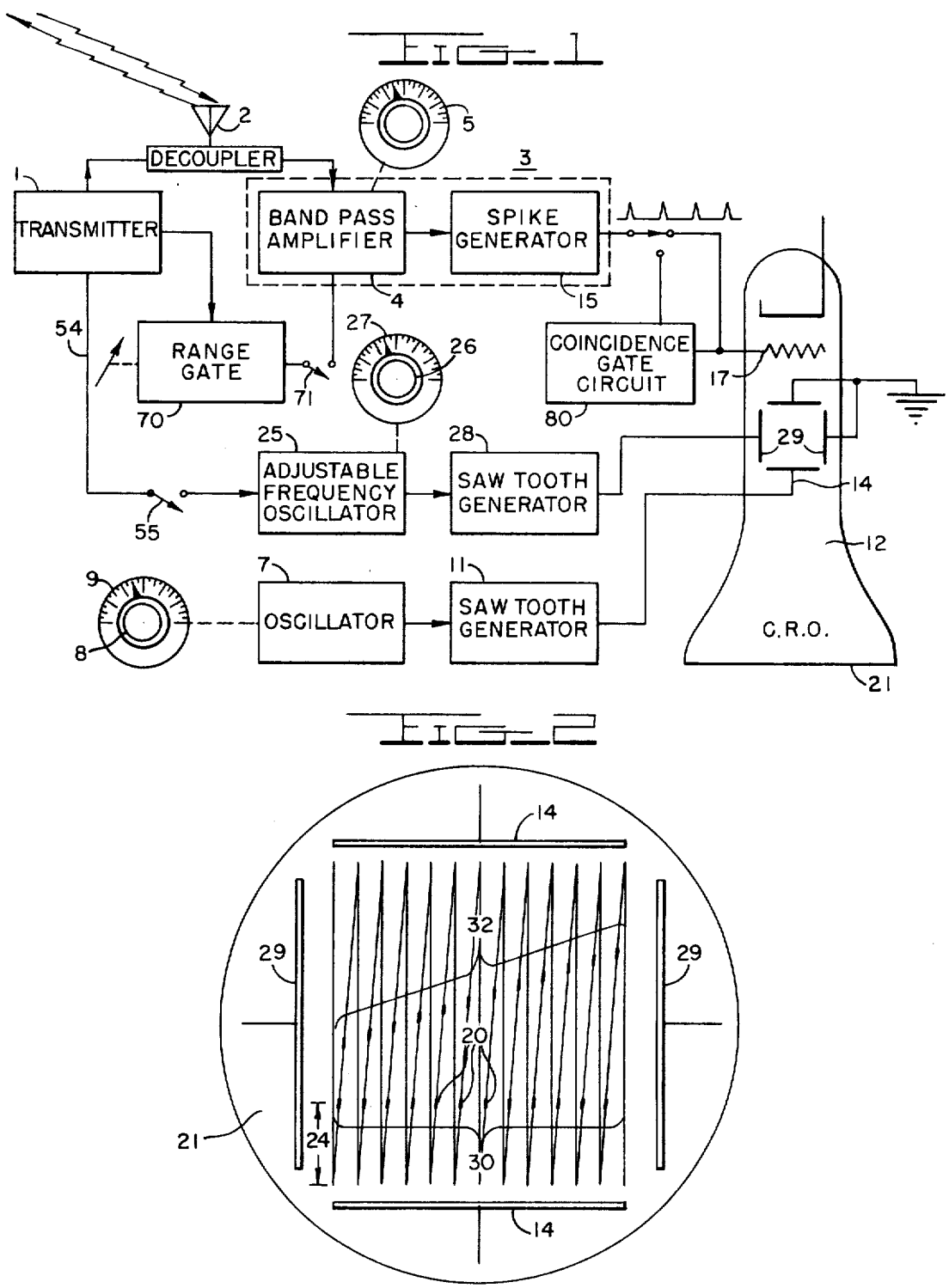

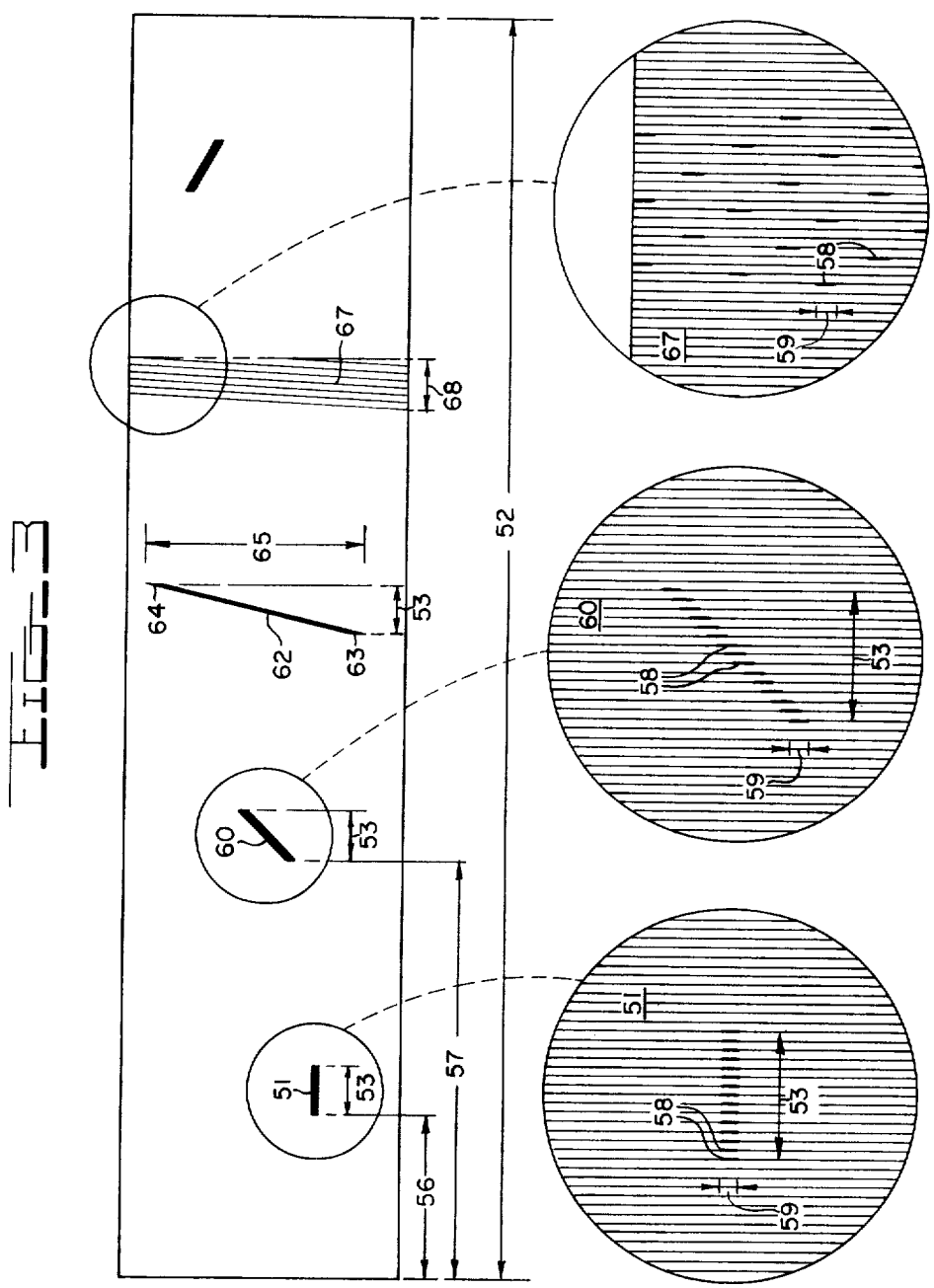

OBJECT DETECTING SYSTEM

This invention relates to object detecting systems, and more particularly to improvements in such systems enabling early detection and classification of remote objects, and determination of their movement and velocity of movement.

In a previous application, Ser. No. 210,270 filed Feb. 9, 1951, now U.S. Pat. No. 3,333,190, there has been disclosed a system for comparing, and measuring the frequency difference between signals of two different frequencies. That system provides a flexible, simple and extremely sensitive measurement of such a frequency difference in terms of the time rate of change of the relative phase of successive cycles of the two frequency signals.

Application of the principles therein disclosed have led to development of a simple and highly effective system of the sonar or radar type for detecting and classifying targets, determining their movement and measuring their velocity.

In such systems, signals in the form of trains or recurrent pulses of wave energy, such as superaudio frequency sound wave or high frequency radio waves, are generated and projected over an area. Echoes of these signals caused by reflections from remote objects are detected, and the time interval between a transmitted signal and a corresponding reflected signal or echo provides a measure of the range of the remote signal-reflecting object. Such systems may also be operated with the signal generating equipment idle, if it be desired only to detect or "listen for" signals transmitted from a remote generator or signal source. In this mode of operation an indication of the presence only of the remote source is obtained, without measurement of range.

Heretofore, the velocity of a remote wave energy reflecting object in a direction perpendicular to the wave front has been obtained by the measurement of the doppler effect, or change of frequency caused by the reflection from the moving object, of the wave energy transmitted. When such wave energy encounters or illuminates an object and is reflected thereby, its frequency is changed, in accordance with well known principles of physics, by an amount proportional to the velocity of the object in the direction perpendicular to the wavefront. If the reflecting object is moving toward the source of energy, the frequency after reflection will be increased. If the object is moving away from the wave energy source, the frequency after reflection will be decreased. The amount that the frequency of the wave energy comprising the transmitted signal is changed upon reflection corresponds to the velocity of the reflecting object, in a direction perpendicular to the wavefront, measured in wavelengths per unit time. This velocity, i.e. the rate of movement of an object in a direction perpendicular to the wavefront, is herein termed range rate. Likewise, if wave energy signals from a remote source or generator are being detected by the receiver of such a system operating with the transmitter idle, and the remote source commences to move or change its velocity in the direction perpendicular to the wavefront, a corresponding change in the frequency of the received signals will be produced, which will provide a measure of the change in range rate of the remote signal source.

A principle deficiency in systems of the prior art designed to detect moving objects has been inability of the systems to detect such movement unless the range rate of the object was relatively quite large or the object was tracked for a considerable length of time. Principle advantages of the system herein disclosed are its inherent ability to detect objects, and selectively indicate their range taken instantaneously even though these range rates may be extremely low.

An object of the invention, therefore, is to provide a novel system for the rapid detection of a remote moving object.

Another object of the invention, is to provide an improved system for instantaneous detection of the movement of a wave signal reflecting object.

Another object is to provide an improved system for displaying wave energy signals reflected from remote objects in such a manner as to enable classification of such remote objects.

Another object is to provide a method and apparatus for indicating and measuring the range rate of a wave signal reflecting object.

Another object is to provide an instantaneous indication of a change in the range rate of a wave signal reflecting object.

Another object is to provide an instantaneous indication of a change in the range rate of a remote wave signal generator.

Another object is to provide a system for obtaining, from the reflection by a remote object of a single train or burst of wave energy, an instantaneous indication of the doppler effect produced by the remote object.

Another object is to provide an indication of the range rate of a wave signal reflecting object relative to the ground or relative to another wave signal reflecting object.

Other objects and features of the present invention will appear more fully hereinafter from the following detailed description considered in connection with the accompanying drawings which disclose one embodiment of the invention. It is expressly understood, however, that the drawings are designed for purposes of illustration only, and not as a definition of the limits of the invention, reference for the latter purpose being had to the appended claims.

Briefly stated, the invention provides a system for sensing continuously the frequency of the wave energy comprising received signals, whether received by reflection from a remote object or directly from a remote source, which system is capable of providing an extremely sensitive instantaneous and continuous visual indication of both large and small changes in such frequency. This indication can be used to provide an extremely accurate measurement of any change in the wave energy frequency, which therefore gives a measure of doppler effect on such signals, and range rate of the object producing the doppler effect.

In the drawings, wherein like reference characters refer to like elements in all the figures:

FIG. 1 is an elementary block diagram of an object detecting system constructed in accordance with our invention.

FIG. 2 is an illustration of one form of signal display obtained in accordance with the invention.

FIG. 3 is another form of signal display obtained in accordance with the invention.

For economy of description and ease of understanding, our invention will be described in its application to an object detection system of the sonar type, wherein the wave energy is propagated through a water medium, and super-audio frequencies are used. Our invention is not limited in application to this particular frequency range or propagation medium, however. Its analogous application to object detection systems of the radar type will be obvious to those skilled in the art.

Referring now to FIG. 1 of the drawings, there is depicted an elementary block diagram of an object detecting system of the sonar type, constructed in accordance with the invention. Wave energy signals are generated in transmitter 1 and transmitted through a signal radiating device commonly known as a transducer 2. These signals are composed of wave energy of a particular frequency and may be pulsed or continuous in form, though pulsed signals in the form of discrete bursts or trains composed of several hundred cycles of the wave energy are more conventional. Transducer 2 also serves, as is well known in the art, to recover wave energy reflected from objects encountered and illuminated by the transmitted signals. Transducer 2 should be broadly tuned, so as to appear as an untuned circuit element to received signals, for reasons which will be explained more fully hereinafter.

Wave energy signals recovered by transducer 2 are conveyed to a receiver 3, the first stage of which may ordinarily consist of a tunable band pass amplifier 4. The band pass amplifier is preferably broadly tuned, with a pass band wide enough to accommodate variations in signal frequency due to doppler effect. The center frequency of the pass band may be adjusted by hand control 5, which therefore serves as a receiver tuning control.

A local oscillator 7 generates a signal whose frequency is adjustable by hand control 8 over a wide range about the carrier frequency to which amplifier 4 is tuned. Dial 9 indicates the frequency of local oscillator 7. The output waveform of local oscillator 7 is converted in sawtooth generator 11 to an equal frequency sawtooth or other waveform suitable to produce a constant velocity deflection of the electron beam in a dark trace cathode ray indicator tube 12, and supplied to its vertical deflection plates 14. The electron beam in indicator tube 12 is thus subject to a constant velocity deflection at a frequency equal to the local oscillator frequency, and synchronized with it, cycle for cycle.

Received wave energy signals are preferably converted in a conventional spike generator 15 within receiver 3 to a series of very narrow spike-shaped waveforms, of the order of one microsecond in length, one for each cycle of the received signal wave energy. This conversion to spikes is accomplished in such a way that successive spikes will have a constant phase relationship with the respective cycles of the received wave from which they are derived. One form which such a spike generator might take, for example, is that of a saturable reactor. Thus the spikes generated from a received signal will be equally spaced, with a period equal to that of the received signal wave energy, while spikes generated from random noise or other extraneous signals will have random spacing. Each spike is presented to the intensity control grid 17 of the oscilloscope 12, and intensifies the electron beam during the portion of a vertical sweep trace in which it occurs. This intensification in turn produces a visibly brightened or intensified portion 20 of the luminescent screen 21 of cathode ray indicator tube 12, as shown in FIG. 2. The size or length of such an intensified portion 20 of the vertical sweep trace will of course vary with the duration of the spike. The spike generator 15 is used to keep the intensified portions small and sharply defined relative to the low intensity background.

When the frequency of the spikes exactly equals the vertical sweep frequency, the intensified portions of successive vertical sweeps will always occur in the same location, i.e., with the same ordinate, on the luminescent screen 21 of cathode ray tube 12. This ordinate 24 will depend on the difference of phase in each vertical deflection cycle between the beginning of the deflection and the time of occurrence of the corresponding spike. When this difference of phase is zero, the ordinate will be zero, that is the intensified portion will appear at the bottom of the vertical sweep. When this phase difference is 359°, the intensified portion will appear at the top of the vertical sweep.

Oscillator 25 produces an output signal which is adjustable in frequency by means of hand control 26 over a wide range of frequencies which are low relative to the received signal frequencies, and which are indicated on calibrated dial 27. The output of oscillator 25 is converted in sawtooth generator 28 to a sawtooth waveform of equal frequency.

Simultaneously with the application of vertical deflection signals, the output of sawtooth generator 28 is supplied to the horizontal deflection plates 29 of the cathode ray tube 12, producing a constant velocity horizontal deflection of the electron beam. Successive vertical sweeps are therefore not superimposed but occupy positions which are successively displaced in a horizontal direction. The intensified portions 20 of these successive vertical sweeps therefore form a coherent brightened trace or oscillogram 30 of linear form on the screen 21, which represents the received signal. Successive elements of the brightened trace 30 have equal ordinates and successively increased horizontal displacement and therefore give the trace 30 a horizontal orientation.

The operation of the system thus far described is as follows. Let it be assumed that transducer 2 is motionless in the water propagation medium for which it is designed, and that conventional sonar operating conditions prevail, such that, for example, signals consisting of wave energy having a frequency of 24 kc/sec. are being transmitted, in the form of trains or pulses, at a pulse repetition frequency of 1 every 6 seconds, with a pulse duration of 0.04 second. Thus each pulse consists of 960 cycles of the transmitted wave energy. Amplifier 4 is then tuned by control 5 to the nominal carrier frequency of 24 kc. It may be computed by well known formulae that the doppler effect on a 24 kc signal reflected from an object having a range rate of 1 knot, or 1 nautical mile per hour, is roughly a frequency change of 16 cycles/sec., assuming a propagation speed for the wave energy of 4800 ft/sec. Amplifier 4 should have a pass band sufficiently broad to accommodate reflected signals shifted by the amount of doppler effect reasonably expected to be encountered. Assuming the upper limit of such doppler effect to be 50 knots, the amplifier 4 must then be capable of passing signals having a frequency range of 23200 cycles/sec. to 24800 cps.

With the receiver 3 tuned to the transmitted signal frequency, oscillator 7 is tuned by hand control 8 to the same frequency. A received signal, consisting of the reflection of a transmitted pulse, will then be converted in spike generator 15 to a series of spikes, one for each cycle of the wave energy comprising the received signal. Since the signal pulse contains 960 cycles of the 24 kc wave energy, 960 spikes will be generated and passed to grid 17. Assuming a spike duration of 1 microsecond, the portion of 24 kc vertical sweep from sawtooth generator 11 which each spike intensifies will be the ratio of 1 microsecond to 1/24000 second, or 24/1000 of the total sweep length. Assuming the total vertical sweep length 31 to be 10 inches, the vertical length of each intensified portion 20 will be 0.24 inches. The horizontal dimension of each intensified portion will of course depend on the sharpness of the electron beam, but will generally be a fraction of its length.

Assuming a horizontal sweep rate of 25 cycles per second, the duration of each horizontal sweep will be 0.04 sec. and all 960 intensified portions will appear on luminescent screen 21 in one horizontal sweep, forming a coherent brightened trace. Such a brightened trace will be similar to trace 30 of FIG. 2, though of course it will have many times the number of brightened portions of trace 30, and hence will appear as a solid line. As explained above, if the frequency of local oscillator 7 is the same as that of the transmitted signals, and the received signal has been reflected by a motionless object, producing no doppler frequency shift, the coherent brightened trace will have a horizontal orientation, such as that of trace 30. The vertical dimension of each portion 20 of the brightened trace will be the length of the vertical sweep which each spike intensifies, which as explained above depends on the duration of the spikes, the vertical sweep speed, and the vertical sweep length, and in the instant example is 0.24 inches for a 10 inch vertical sweep length.

If a change occurs in the frequency of the wave energy comprising the received signal, the period of the spikes generated from successive cycles of this wave energy will also change. Therefore the phase difference between successive spikes produced by spike generator 15 and the beginning of the vertical sweep cycle during which each occurs, will progressively increase or decrease, depending on the direction in which the received signal frequency changes. Since the phase of a spike relative to a vertical sweep cycle determines the ordinate of the portion 20 of the sweep it intensifies, the intensified portions of successive vertical sweeps will have progressively varying ordinates, and the resulting coherent brightened trace will acquire a new orientation, sloping up or down. Trace 32 in FIG. 2 shows how this condition will be indicated on the screen 21 of the indicator tube 12.

Thus a change in the frequency of the wave energy comprising signals reflected from a remote object, from its frequency as transmitted, is instantaneously indicated on the cathode ray tube as a variation in the slope or orientation of the brightened trace.

The initial ordinate of the displayed signal has no particular significance, since it is dependent only on the relative phase between the first spike generated from the received signal and the beginning of the vertical sweep cycle during which the spike occurs.

Since an incremental display signal is developed for each cycle of the wave energy within the reflected pulse signal, it is possible to display any phase modulation of the cycles which may be imposed by the character of the reflecting surface. Intercycle phase modulation of the cycles of wave energy within a reflected pulse signal causes proportionate variations in the ordinate of respective elements 20 representing these cycles, which distort the shape of the brightened trace accordingly. From the nature and degree of distortion and the configuration of the oscillogram which results, the phase modulation characteristics of the wave energy reflecting object may be adduced. In this manner reflecting objects having particular phase modulating characteristics may be classified and identified by the intercycle phase modulation imposed upon a reflected pulse.

By adjusting the frequency of the local oscillator 7 to make the period of the vertical sweep frequency equal to the period of the spikes generated from the received signal, the orientation of the brightened trace 32 may be restored to horizontal, or to whatever slope it had before the change in frequency. The amount of such frequency adjustment necessary to restore the brightened trace to its former, or reference, orientation gives a measure of the amount that the transmitted signal wave energy frequency has been changed by reflection. This is in turn a measure of the doppler effect produced by the remote wave energy reflecting object, and hence is a measurement of its range rate.

The system above described has many advantages. For example, it will be apparent that only a few cycles of the wave energy comprising a signal must be received in order to provide a sufficient number of spikes at the output of spike generator 15 to produce a coherent, discernible linear trace or oscillogram such as 30, with a definite orientation on the face of the oscilloscope. Therefore, in the application of our invention to systems for object detection wherein pulses of wave energy are transmitted for reflection from remote objects, only a single pulse or train of wave energy, provided it contains several cycles of the wave energy, need be received and displayed in order to indicate range rate. Thus when the transmitter 1 is being operated to generate pulses of wave energy, a remote object need be illuminated with only one pulse signal, and the reflected pulse recovered, to indicate the range rate of the object.

Also, a very minute change in the carrier frequency of the received signal, and hence the period of the spikes generated therefrom, though producing only a very minute change in ordinate of successive brightened portions from one vertical sweep to the next, will produce over the course of the large number of vertical sweeps a cumulative variation in ordinate which is easily discernible. When the horizontal sweep frequency is low, a great many vertical deflections take place during the period of one horizontal deflection, and a very large number of adjacent brightened portions of successive vertical sweeps can be accommodated in one horizontal sweep. Therefore by choosing a horizontal sweep rate low enough to permit the brightened portions representing one whole received signal pulse to occupy the entire horizontal sweep length, the sensitivity and accuracy with which any change in received signal carrier frequency can be indicated is very large. This in turn provides an extremely sensitive measure of the range rate of the remote signal-reflecting object.

The system above described for displaying received signals has another inherent advantage over signal receiving and displaying systems known to the prior art. This advantage arises from the fact that each cycle of the received signal wave energy is enabled to provide an incremental signal, i.e., a spike, which in turn contributes an incremental portion or element, such as brightened portion 20, of the display representing the signal. That is, from only a single pulse signal containing several cycles of wave energy, several incremental display signals are obtained. All these increments are displayed in a definite pattern, so nearly simultaneously in time that there is produced an integrated coherent indication of the whole received signal.

It will be recognized that this process of visual integration of the incremental portions of one pulse signal is quite different than conventional practice in the prior art, wherein one whole pulse signal provides but a single incremental indication, and several whole pulses must be displayed in a particular relation in order to achieve an integrated indication of the presence of a remote signal reflecting object.

By adjusting the relation of the horizontal sweep frequency generated by oscillator 25 to the vertical sweep frequency generated by oscillator 7, a different type of signal display such as that shown in FIG. 3 can be produced on screen 21. Let it be assumed that a total range of 800 yds. in front of transducer 2 is to be scanned for signal reflecting objects, whose presence and range rate it is desired to know. Again transmitting a 0.04 second pulse of wave energy having a frequency of 24 kc, and with the frequency of oscillator 7 adjusted to 24 kc, the pulse repetition frequency is adjusted to allow time enough between pulses for a pulse to be reflected and return from a target at the maximum desired range, in accordance with conventional practice in sonar and radar systems. Assuming again a nominal propagation speed of 4800 ft/sec. for the signals, this time between pulses should be 1 second for an 800 yd. maximum range. Thus the pulse repetition frequency is adjusted to one per second.

The horizontal sweep frequency is then adjusted to equal the signal pulse repetition frequency. With a horizontal sweep frequency of 1 cycle/sec., instead of the higher frequency employed to obtain the display shown in FIG. 2, a linear trace 51 representing a single reflected pulse signal of 0.04 sec. duration will occupy 1/25 of the total horizontal sweep length 52 instead of the entire horizontal sweep length. For a 10 inch horizontal sweep, then, the total horizontal dimension 53 of a received reflected signal will be 2/5 inch.

Oscillator 25 is synchronized with transmitter 1 by conventional means through connecting lead 54 and switch 55 so that the beginning of each horizontal sweep coincides with the transmission of a pulse signal. Thus a signal reflected from a remote object will be displayed on screen 21 with an abscissa 56, 57 etc. proportional to the range of the respective reflecting object, in a manner similar to the conventional presentation known to the art as Type A.

If it is desired to scan a greater range that 800 yds. in front of transducer 2, the time between pulses must be increased accordingly. The horizontal sweep speed must therefore be decreased to remain synchronized with the lower pulse repetition frequency. The result of such a decrease in horizontal sweep speed is that the brightened trace representing a single pulse signal will occupy a smaller fraction of the horizontal sweep length, which in turn makes the orientation of the signal trace difficult to discern. To avoid this difficulty the physical length of the horizontal sweep should be increased, for example, by using a larger cathode ray tube, or using a plurality of tubes and displaying consecutive increments of range on each one.

It will be understood that signal trace 51 in FIG. 3 is the equivalent of trace 30 in FIG. 2, though greatly condensed horizontally because of the difference in horizontal sweep speed. Likewise the horizontal orientation of the trace 51 indicates that the transmitted signal has been reflected without doppler effect. The length of the vertical sweep occupied by each element 58 of trace 51 is the same proportion of the total vertical sweep length as that occupied by each element 20 of trace 30. Since the total vertical sweep length of the display shown in FIG. 3 is much less than that of FIG. 2, however, the actual vertical dimension 59 of the elements 58 of trace 51 is correspondingly less than that of trace 30.

As explained in detail in connection with FIG. 2, the orientation of the signal trace varies with the variation in the received signal carrier frequency and the shape of the trace varies with the phase modulation imposed on the signal by the reflecting object. For a small difference in frequency between the wave energy of a transmitted pulse and that of its reflection, the received signal trace will have a slight slope, as at 60, in the same manner as trace 32 of FIG. 2. This is because the intensified elements 58 of the successive vertical sweeps which represent the received signal will have a progressively varying phase relation with the beginning of their respective sweep cycles, and hence will have progressively varying ordinates on the screen 21.

There results from such an arrangement a display of reflected pulse signals, as shown in FIG. 3, whose horizontal dimension 53 depends on the pulse duration and horizontal sweep speed, whose elements 58 have vertical dimensions 59 dependent on the spike duration, whose orientation provides an indication of the doppler effect produced by reflection of the transmitted pulse, and whose displacement 56, 57 etc. along the horizontal time base on the display indicates the elapsed time between transmitted and received signals, or the range of the signal reflecting object.

A variation in the orientation of a signal trace has an unusual effect on its size, as will now be explained. When the frequency difference is large enough to cause the phase relation between the spikes and their respective vertical sweep cycles to change by a large fraction of 360° during the reception of one pulse signal, the trace representing the signal will appear as at 62. The total horizontal dimension 53 of signal trace 62 remains 1/25 of the horizontal sweep length, and the vertical dimension of each element remains equal to that of each element 58 of signal traces 51 and 60. However the successive elements vary in phase from a slight lag behind the start of the vertical sweep, at the beginning 63 of the signal trace, to a substantial phase lag at the end 64 of the trace.

The orientation of signal trace 62 may be interpreted in terms of frequency shift as follows. The vertical spread 65 of the elements of signal 62 over 5/6 of the total vertical sweep length indicates that the spikes from the received signal acquire a cumulative phase lag behind the vertical sweep cycles 5/6 × 360° or 300° in the time of one pulse. Since the pulse duration was taken to be 0.04 sec. the spikes lag the vertical sweeps at the rate of 300° × 25 ÷ 360° = 20 5/6 cycles/sec. Since the spikes have the same periodicity as the wave energy in the received pulse signal, this means the wave energy frequency of the reflected received signal is 20 5/6 cycles/sec. lower than the wave energy frequency of the transmitted pulse signal, to which oscillator 7 is tuned. This in turn indicates that the signal reflecting object has a range rate of about 1¼ kts. (at 16 cycles/knot, as explained above), away from the transducer 2.

In the case of a signal reflecting object which has a higher range rate, say 10 kts, the frequency shift between the wave energy of a transmitted pulse and that of its reflection will be approximately 160 cycles/sec. This is, in turn, a shift of 6.4 cycles in the 0.04 sec. duration of a received signal, so that the phase relation between the spikes and the respective vertical sweeps which they intensify varies over $360 \times 6.4 = 2304°$ during the display of one received signal. This means that the ordinates of successive intensified elements 28 of the 960 successive vertical sweeps upon which one received signal pulse is displayed vary through the full vertical sweep length, which represents 360° of phase in the sweep cycle, 6.4 times. The result is depicted by signal trace 67 in FIG. 3, which is composed of 6.4 brightened linear segments having a slope sufficiently steep so that the total horizontal dimension 68 of the signal trace 67 is the same as the horizontal dimension 53 of signal traces 51 and 62, i.e., 1/25 of the horizontal sweep length.

From a comparison of signal traces 51, 60, 62, and 67, it may be seen that not only does the slope of the trace which represents a signal vary with doppler effect, indicating which signal reflecting objects have a range rate, and how large it is, but also the manner in which the signals are displayed inherently increases the size of signal traces from moving objects in proportion to their range rate, making reflecting objects with substantial range rates much more discernible than those from objects whose range rate is zero. Thus the type of signal display above described provides a presentation from which object presence, range, and range rate can be readily observed, on which the display of a signal reflected by an object varies in size with the range rate of its reflector, and on which the shape of the signal trace provides an indication of the signal phase modulating characteristics of the reflecting object.

By the use of a conventional range gating control 70 connected through switch 71 to receiver 3, reflected signal reception may be confined to signals from reflecting objects within a particular increment of range from the transducer 2. When this is done the reflected signals from a particular object can be observed more closely by adjusting control 26 to increase the horizontal sweep speed from the value established for the display of FIG. 3, to establish an indication of the type shown in FIG. 2. Suitable readjustment of the local reference frequency oscillator 7 provides a readily available and extremely sensitive and accurate measurement of the range rate of the particular object within that range increment, as explained hereinbefore.

Since a horizontal orientation of a brightened signal trace indicates that a received signal frequency and the frequency of local oscillator 7 are equal, the locally generated reference frequency of oscillator 7 may be easily, quickly and accurately tuned to equal the frequency of signals received from any particular reference object. Once this adjustment is made, the orientation of a signal trace representing a reflection from another object provides a measure of the range rate of the other object relative to the reference object. For example, if it is desired to measure the range rate of an unknown signal-reflecting object with reference to the ocean bottom in its vicinity, the local reference oscillator 7 is first tuned to match the frequency of wave energy reflected from that particular area of bottom. Then reflected signals from the unknown object, when displayed, are related by their frequency to signals reflected from the ocean bottom, i.e., the ground, and any difference frequency will be indicated on the indicator by the slope of the brightened trace, which provides a measure of range rate of the unknown object relative to the ocean bottom in its vicinity.

Likewise the range rate of a signal reflecting object may be determined relative to that portion of the wave energy propagating medium which is in the immediate vicinity of the transducer 2. This may be done by tuning the local reference frequency oscillator 7 to provide a horizontal slope for the brightened trace formed by spikes generated from reverberation signals from the medium in the immediate vicinity of the transducer. Such an arrangement has the effect of cancelling out any doppler effect due to motion of transducer 2, through the medium, such as might be incurred if transducer 2 were mounted on a moving ship.

If transducer 2 is moving through the medium it is possible to measure the range rate of the transducer 2 relative to a reference object by measuring the doppler effect produced by the reflection of wave energy from the object. A particularly useful application of this measurement provides a determination of the speed of transducer 2 through the ocean, relative to the ocean bottom. This measurement is obtained by transmitting a wave energy signal from transducer 2 in the direction in which transducer 2 is moving through the propagation medium, here defined as the ocean, and observing the doppler effect on reflections from the ocean bottom in that direction. The wave energy signal should preferably leave the transducer with a horizontal direction of propagation. It is a peculiar and well known property of wave energy propagation through the ocean that refractions are caused by temperature and salinity gradients, which cause wave energy leaving the transducer in a horizontal direction to be progressively refracted down to the ocean bottom. Upon reflection, some of the wave energy will return to the transducer over a propagation path which is the same as its transmittal propagation path. It can be shown mathematically that the frequency change in the wave energy received after such an excursion is a direct measure of the speed of the transducer 2 over the ocean bottom, in the direction of propagation of the wave energy transmitted from the transducer. Thus a highly useful system for measuring own ship speed over the ground has been described.

When transmitter 1 is not in operation, receiver 3 can be used to detect signals arriving at transducer 2 from remote signal generating sources. In this mode of operation, receiver 3 is tuned by hand control 5 to any frequency which it may be desired to investigate, and any signals of this frequency which are intercepted by transducer 2 are passed by the receiver 3 to spike generator 15. In the spike generator 15 received signals from remote signal generating sources are converted to spikes in exactly the same manner as the reflections of signals originally propagated from transducer 2. Received signals are displayed in the manner shown in FIG. 2.

Local oscillator 7 should be tuned to a frequency closely approximate the particular frequency to which receiver 3 is tuned, for the same reason that local oscillator 7 is tuned to the transmitted signal frequency when transmitter 1 is in operation, so that the display of received signals on the screen 21 will form an approximately horizontal brightened trace. It is desirable to have the trace approximately horizontal because it is more easily discernible from the background display of extraneous signals and makes possible earlier recognition of the presence of the remote source than is possible with a steeply sloping trace or traces.

Oscillator 25 is also adjusted in this mode of operation to provide a relatively fast horizontal sweep, to the end that a received signal will be spread out horizontally, and be more easily discernible. The fast horizontal sweep also inherently makes a brightened trace assume a more horizontal orientation, because with a shorter sweep time any one brightened trace will be composed of fewer brightened portions 20, and their cumulative variation in ordinate will be small.

With oscillators 7 and 25 so adjusted, display of any received signal in an orientation other than horizontal indicates that the frequency of the wave energy comprising the received signal differs from the particular frequency to which the receiver is tuned. This difference, of course, must be small enough to permit accommodation of the received signal by the pass band of the receiver 3, or no display would appear.

Once a signal is received, local oscillator 7 may be readjusted to the exact frequency of the received signal wave energy by tuning for an exactly horizontal signal trace. While this adjustment is being made, reduction of the horizontal sweep frequency by adjustment of oscillator 25 will increase the sensitivity and accuracy of the adjustment of oscillator 7, as explained heretofore. When the brightened trace representing the received signal is properly adjusted to a horizontal orientation, this orientation will serve as a reference by which subsequent changes in the received signal wave energy frequency can be noted and measured, in the same manner as changes in frequency of the wave energy comprising object-reflected signals. Thus if the remote signal source has a particular range rate when initially detected, the doppler effect due to any subsequent change in this range rate can be instantly detected and measured. If the remote signal source has a zero range rate when initially detected, any range rate it subsequently acquires can be instantly detected and measured.

A broadly tuned transducer 2 and receiver 3 are used to avoid undesirable results which are inherent in the use of narrowly tuned elements. This may be explained as follows. If two signal wavetrains of the same frequency, but different phase, such as reflected signals from two motionless targets, for example, were received simultaneously by narrowly tuned circuit elements, the narrowly tuned circuit would enable domination of the weaker signal by the stronger, to produce a single resultant output signal from the receiver of unchanged wave energy frequency, but single phase. Such phase distortion of the wave energy in the received signals would accordingly produce a change in the number and phase of spikes derived from the received signals at spike generator 15, from the number and phase of spikes which would be generated to represent the two signals independently. Thus during the time both signals were being received, the resulting signal trace would provide an inaccurate and misleading representation.

Another disadvantage inherent in the use of a narrowly tuned transducer 2 is that random signals may succeed in causing the narrowly tuned circuit to resonate and deliver a false signal to the receiver 3 which has a frequency equal to the resonate frequency of the transducer 2. Such a signal might be passed by the receiver 3 and displayed in the same manner as a genuine received signal, and thus produce a false indication on screen 21.

To eliminate these advantages, a broadly tuned transducer and a receiver 3 are used, which are not subject to being resonated by random signals, and permit any number of simultaneously received signals, of equal frequency and different phases, to pass to spike generator 15 with their phases undistorted.

To prevent the display of spikes generated from random signals which, though falling within the pass band of transducer 2 and amplifier 4, may not be composed of cycles having a regular recurrence at the frequency to which receiver 3 is tuned, a coincidence delay circuit 80 may be interposed between the spike generator 15 and cathode ray tube 12.

This circuit, which may be of the type shown in FIG. 4 of U.S. Pat. No. 2,412,974 to DeLoraine for example, is designated to produce an output pulse exceeding a predetermined amplitude level in response only to those spikes of a train having a predetermined periodicity which are preceded by a predetermined minimum number of spikes within the train. Thus the coincidence delay circuit 80 will reject random signals having the proper spacing, but insufficient in number, or a train of spikes exceeding the minimum number, but of improper spacing.

Spikes generated from received signals may vary from the proper periodicity, and still achieve the coincidence necessary to pass through coincidence delay circuit 80, by an amount proportional to the spike width. The period of the output spikes from spike generator 15, during reception of the 24000 cycle/sec. signal hereinbefore described, is 41.7 microseconds. Assuming the spikes to be one microsecond wide, the resulting variation in periodicity which will be tolerated by coincidence delay circuit 80 is one part in 41.7, or about a 4 percent signal frequency variation. Signals varying from the desired frequency by a greater amount will not be displayed.

Thus it may be seen that there has been shown and described an object detection system in which objects may be detected, their wave energy reflecting characteristics promptly classified, their movement determined, and their velocity of movement measured quickly and accurately.

Although only one embodiment of the invention has been disclosed and described herein, it is expressly understood that various changes and substitutions may be made therein without departing from the spirit of the invention as understood by those skilled in the art. For example the extension to measuring the velocity of an airplane or other vehicle, relative to the ground or other reference datum, will be obvious to one skilled in the art. Reference therefore should be had to the appended claims for a definition of the limits of the invention.

The invention described herein may be manufactured and used by or for the Government of the United State of America for governmental purposes without the payment of any royalties thereon or therefor.

What is claimed is:

1. A system for detecting the movement of a remote object comprising transmitting means for illuminating said remote object with a signal of wave energy, receiving means for recovering an echo reflected by said object, signal display means responsive to said echo to provide a separate visual display of each cycle of said reflected echo, and frequency comparing means responsive to a difference in frequency between the wave energy of said received echo and the wave energy of said transmitted signal to vary the orientation of said visual indication from a reference orientation, whereby a variation in said orientation will provide an instantaneous indication of a doppler effect on said transmitted wave energy.

2. A system for detecting the movement of remote objects comprising transmitter means for illuminating an object with a pulse of wave energy, receiver means for recovering a portion of said wave energy pulse reflected by said remote object, a local oscillator for generating local oscillations at the frequency of said transmitted wave energy, display means for producing a separate visual display of each cycle of said pulse from said object, said visual display having an orientation which is responsive to the phase difference between successive cycles of the wave energy of each reflected pulse and successive cycles of said local oscillations whereby objects producing a doppler effect on said transmitted pulse will be displayed with an orientation different than the display of objects producing no doppler effect.

3. A system for measuring the range rate of a remote object comprising transmitter means for illuminating said object with a pulse of wave energy, receiver means for recovering an echo pulse of said wave energy reflected by said object, a local oscillator for generating local oscillations, display means for producing a separate visual display of each cycle of said echo pulse, said visual display having an orientation which is responsive to the phase difference between successive cycles of the wave energy of said echo pulse and successive cycles of said local oscillations, frequency adjusting means in said local oscillator for tuning said local oscillator to the frequency of said transmitted wave energy to establish a reference orientation on said display means whereby a doppler effect produced on said echo pulse by reflection from said remote object will vary the orientation of the display of said echo pulse, and means measuring the adjustment of said frequency adjusting means necessary to restore said received signal display to said reference orientation to determine the amount of said doppler effect.

4. A system for measuring a change in the range rate of a remote object comprising transmitter means for illuminating said object with pulses of wave energy, receiver means for recovering echo pulses of said wave energy reflected by said object, a local oscillator for generating local oscillations at a frequency approximate to the frequency of said transmitted wave energy, display means for producing a separate visual display of each cycle of said echo pulses, said visual display having an orientation which is responsive to the phase difference between successive cycles of the wave energy of each of said echo pulses and successive cycles of said local oscillations whereby echo pulses from one of said objects having a first range rate will be displayed with a first orientation and echo pulses from said one object after a change from said first range rate will be displayed with a second orientation, means for varying the frequency of said local oscillations to restore the orientation of said display from said second orientation to said first orientation, and means for measuring said variation in said local oscillator frequency.

5. In a wave energy echo system for detecting remote objects including means for illuminating a remote object with a wave energy signal and recovering a reflection thereof from said object, means for determining the doppler effect produced on a transmitted wave energy signal by reflection from a remote object comprising a local oscillator, means adjusting said local oscillator to the transmitted wave energy frequency, receiver means for recoverng said reflected signal, display means fed by the output of said local oscillator and the reflected signal for indicating the difference between the period of cycles of the wave energy in said reflected signal and respective cycles in the output of said local oscillator, means varying said local oscillator frequency to reduce the indication of said difference to zero, and means measuring said variation.

6. A system for measuring the range rate of a remote object relative to that of a selected reference object comprising transmitter means for illuminating both of said objects with signal pulses of wave energy, receiver means for recovering wave energy echo pulses reflected from said objects, signal display means for producing a separate visual of each cycle of said echo pulses, a local oscillator for generating local oscillations, said visual display having an orientation which is responsive to the phase difference between successive cycles of said local oscillations and successive cycles of the wave energy of said respective echo pulses, means adjusting the frequency of said local oscillations to establish a reference orientation of the echo pulses from said selected reference object, means for varying the frequency of said local oscillations by an amount necessary to orient the display of remote object echo signals in said reference orientation, and means for measuring said frequency variation, whereby said frequency variation provides a measure of the difference in range rate between said remote object and said selected reference object.

7. In a wave energy echo system for detecting remote objects by transmitting wave energy signals having a particular frequency and receiving said wave energy signals after reflection from said objects, received signal display means for indicating the detection of an object comprising an untuned receiver for receiving said reflected signals, a cathode ray indicator tube including means providing an electron beam and a luminescent screen receiving said beam, spike generating means operative responsive to a selected rate of change of amplitude in each cycle of the wave energy of said received signals to generate a control signal having a duration short relative to the period of said particular frequency signal, means producing a constant velocity sweep of said electron beam across said luminescent screen in a first direction at an adjustable reference frequency, means producing a constant velocity sweep of said electron beam across said screen in a second, orthogonal direction at low frequency, intensity control means for said electron beam operative responsive to said control signal to produce a bright spot on said luminescent screen, and means for adjusting said reference frequency to equal said particular frequency, whereupon said bright spots representing signals having said particular frequency from coherent traces having a horizontal orientation on said luminescent screen and said bright spots representing signals having frequencies different from said particular frequency form coherent traces having a sloping orientation on said luminescent screen.

8. In a system for detecting objects by transmitting wave energy and recovering a portion of said wave energy reflected by said objects, means for indicating a moving object comprising an oscillograph having a two coordinate indicating medium, an indicating element therefor, first deflection means for cyclically sweeping said indicating element at constant velocity across said medium in a first coordinate, second deflection means for cyclically sweeping said indicating element at constant velocity across said medium in a second coordinate, and control means for actuating said indicating element responsive to a control signal; means generating said control signal from each cycle of the reflected wave energy to form successive indications on said indicating medium; means operating said first deflection means at a frequency approximate to that of said transmitted wave energy; means operating said second deflection means at an adjustable low frequency to form a coherent oscillogram from said successive indications on said indicating medium; and means for varying the sweep frequency of said first deflection means to define a reference orientation of said oscillogram when the frequency of said reflected wave energy equals that of the transmitted wave, whereby an oscillogram formed from reflected wave energy having a frequency different than said transmitted wave frequency will have an orientation different than said reference.

9. In a system for detecting objects by transmitting wave energy and recovering a portion of said wave energy reflected by said objects, means for indicating a moving object comprising an oscillograph having a two coordinate indicating medium, an indicating element therefor, first deflection means for cyclically sweeping said indicating element at constant velocity across said medium in a first coordinate, second deflection means for cyclically sweeping said indicating element at constant velocity across said medium in a second coordinate, and control means for actuating said indicating element responsive to a control signal; means generating said control signal from each cycle of the reflected wave energy to form successive indications on said indicating medium; means operating said first deflection means at a frequency approximate to that of said transmitted wave energy; means operating said second deflection means at low frequency to form a coherent oscillogram from said successive indications on said indicating medium; means for varying the sweep frequency of said first deflection means to define a reference orientation of said oscillogram when the frequency of said reflected wave energy equals that of the transmitted wave, whereby an oscillogram formed from reflected wave energy having a frequency different than said transmitted wave frequency will have an orientation different than said reference; and means for indicating the variation of said first deflection frequency necessary to restore the orientation of said oscillogram to the reference orientation, to provide a measure of the frequency difference between said transmitted and reflected waves.

10. In a wave energy echo system for detecting remote objects including means for illuminating a remote object with a wave energy signal and recovering a reflection thereof from said object, means for displaying said reflected signal comprising an oscillograph having a two coordinate indicating medium, an indicating element therefor, first deflection means for cyclically sweeping said indicating element at constant velocity across said medium in a first coordinate, second deflection means for cyclically sweeping said indicating element at constant velocity across said medium in a second coordinate, and control means for actuating said indicating element responsive to a control signal; means generating a control signal from each cycle of the wave energy in said reflected signal to form successive indications on said indicating medium; means operating said second deflection means at a low frequency to form a coherent oscillogram from said successive indications on said indicating medium; means for controlling the sweep frequency of said first deflection means to define a reference orientation of said oscillogram when the frequency of said reflected wave energy equals a selected frequency, whereby an oscillogram formed from reflected wave energy having a frequency different than said selected frequency will have an orientation different than said reference; and means for indicating the variation of said first deflection frequency necessary to restore the orientation of said oscillogram to the reference orientation, to provide a measure of the frequency difference between said reflected and said selected frequency.

11. Means for measuring the velocity in a selected direction of a vehicle relative to a reference object comprising means for propagating a train of wave energy having a particular frequency from said vehicle in said selected direction and recovering a reflection of said propagated wave energy from said object; means for generating a control signal from each cycle of said recovered wave energy; an oscillograph including a two coordinate indicating medium, an indicating element therefor and control means for actuating said indicating element responsive to said control signals; first deflection means for cyclically sweeping said indicating element across said medium in a first direction at said particular frequency; second deflection means for cyclically sweeping said indicating element across said medium in a second direction normal to said first direction at a frequency low relative to said particular frequency to form the indications of successive control signals on said medium an oscillogram having a reference orientation when said velocity equals zero; means for varying the first direction sweep frequency of said indicating element from said particular frequency by an amount necessary to orient the oscillogram produced by wave energy reflected from said reference object in said reference orientation; and means for measuring said sweep frequency variation to indicate the doppler effect on the wave energy in said train.

12. Means for indicating the speed of a first object relative to a second object in a selected direction comprising means for illuminating said first and second objects with a train of wave energy traveling in said selected direction and recovering a reflection of said wave energy from each of said objects; means for generating a control signal from each cycle of the wave energy in said reflected wave energy signals; an oscillograph including a two coordinate indicating medium, an indicating element therefor and control means for actuating said indicating element responsive to said control signals; first deflection means for cyclically sweeping said indicating element across said medium in a first direction at a first frequency; second deflection means for cyclically sweeping said indicating element across said medium in a second direction normal to said first direction at a frequency low relative to said first frequency to form from said control signals oscillograms on said medium representing said reflected signals; means for adjusting said first frequency to position said oscillogram representing said reflected signal from said first object in a selected reference orientation on said medium; means for varying said first frequency from its adjusted value to position said oscillogram representing said reflected signal from said second object in said selected reference orientation; and means for indicating the amount of said frequency variation.

13. In a wave energy echo system for detecting remote objects including means for illuminating a remote object with a pulse of wave energy having a particular frequency and recovering a reflection thereof from said object, means for displaying the inter-cycle phase modulation and measuring the doppler effect impressed on the wave energy of said pulse by reflection from said object to indicate the phase modulating characteristics of the reflecting surface of said object and the relative velocity of said object comprising an oscillograph including a two coordinate indicating medium, an indicating element therefor and control means for actuating said indicating element responsive to said control signals; first deflection means for cyclically sweeping said indicating element across said medium in a first direction at said particular frequency; second deflection means for cyclically sweeping said indicating element across said medium in a second direction normal to said first direction at a frequency low relative to said particular frequency to form the indications of successive control signals on said medium an oscillogram having a reference orientation when the frequency of said reflected wave energy equals said particular frequency; means for varying the first direction sweep frequency of said indicating element from said particular frequency to orient the oscillogram produced by wave energy reflected from said remote object in said reference orientation, whereupon the shape of said oscillogram provides a characteristic indication of said inter-cycle phase modulation; and means for measuring the magnitude of said frequency variation.

14. In a wave energy echo system for detecting remote objects by transmitting wavetrain signals and recovering echoes thereof from said objects, means for obtaining from a single echo the range, range rate and wave energy reflecting characteristics of a remote object comprising means for generating a control signal from each cycle of the wave energy in said echo; an oscillograph including an indicating medium and an indicating element therefor; first deflection means for cyclically sweeping said indicating element across said medium in a fist direction at the frequency of the wave energy in said transmitted signal; second deflection means for sweeping said indicating element across said medium in a second direction normal to said first direction to establish a time base; means for synchronizing the start of said second direction time base sweep with the transmission of said transmitted signal; control means for actuating said oscillograph indicating element responsive to each of said control signals to produce an indication on said medium, whereupon the plurality of indications representing the respective control signals produced from the respective cycles of wave energy in said echo form a coherent oscillogram on said indicating medium; said oscillogram having a particular displacement on said time base in said second direction proportional to said object range, a particular configuration indicative of said object wave energy reflecting characteristics, and being oriented with a slop proportional to said object range rate.

15. In a wave energy echo system for detecting remote objects by transmitting wavetrain signals and recovering echoes thereof from said objects, means for obtaining from a single echo the range, range rate and wave energy reflecting characteristics of a remote object comprising means for generating a control signal from each cycle of the wave energy in said echo; an oscillograph including an indicating medium and an indicating element therefor; first deflection means for cyclically sweeping said indicating element across said medium in a first direction at the frequency of the wave energy in said transmitted signal; second deflection means for sweeping said indicating element across said medium in a second direction normal to said first direction to establish a time base; means for synchronizing the start of said second direction time base sweep with the transmission of said transmitted signal; control means for actuating said oscillograph indicating element responsive to each of said control signals to produce an indication on said medium, whereupon the plurality of indications representing the respective control signals produced from the respective cycles of wave energy in said echo form a coherent oscillogram on said indicating medium; said oscillogram having a particular displacement on said time base in said second direction proportional to said object range, a particular configuration indicative of said object wave energy reflecting characteristics, and being oriented with a slop proportional to said object range rate; means for adjusting the sweep frequency of said first deflection means to orient oscillograms representing echoes from objects having a selected range rate in a selected reference orientation, whereupon a particular oscillogram representing an echo from a particular object having a different range rate will have an orientation different than said reference orientation; means for varying the sweep frequency of said first deflection means to restore the orientation of said particular oscillogram to said reference orientation; and means for measuring said frequency variation to determine the doppler effect produced by said particular object.

16. A system for measuring a change in range rate of a remote wave signal source comprising means for receiving signals generated by said source; means for generating a control signal from each cycle of the wave energy in said received signals; an oscillograph including a two coordinate indicating medium, an indicating element therefor and control means for actuating said indicating element responsive to said control signals; first deflection means for cyclically sweeping said indicating element across said medium in a first direction at a first frequency; second deflection means for cyclically sweeping said indicating element across said medium in a second direction normal to said first direction at a frequency low relative to said first frequency to form from said control signals oscillograms on said medium representing said received signals; means for adjusting said first frequency to position said oscillograms representing said received signals in a selected reference orientation on said medium corresponding to a first range rate of said remote signal source; whereupon a change in the range rate of said remote signal source will produce an instantaneous variation in the orientation of the display of said received signals; and calibrated means for measuring the adjustment of said frequency adjusting means necessary to restore the orientation of said received signal display to said reference orientation.

* * * * *